United States Patent
Chartrain et al.

[11] Patent Number: 6,092,955
[45] Date of Patent: Jul. 25, 2000

[54] APPARATUS FOR CLAMPING TOGETHER TWO MEMBERS

[75] Inventors: Michel Chartrain, Lunay; Laurent Gallou, Vendome, both of France

[73] Assignee: Lemförder Nacam SA, Vendome, France

[21] Appl. No.: 09/094,627

[22] Filed: Jun. 15, 1998

[30] Foreign Application Priority Data

Jun. 23, 1997 [FR] France .................................. 97 07975

[51] Int. Cl.[7] ...................................................... B16D 1/18
[52] U.S. Cl. ........................ 403/283; 403/110; 403/104; 74/527; 74/493
[58] Field of Search ..................................... 403/283, 110, 403/83, 104, 105, 106, 107, 373; 280/775; 74/493, 527

[56] References Cited

U.S. PATENT DOCUMENTS

| | | |
|---|---|---|
| 5,338,064 | 8/1994 | Sadakata et al. ...................... 74/493 X |
| 5,520,411 | 5/1996 | Lang et al. ........................... 403/283 X |
| 5,709,132 | 1/1998 | Irish et al. .............................. 74/502.4 |
| 5,743,150 | 4/1998 | Fevre et al. ................................ 74/493 |
| 5,893,676 | 4/1999 | Yamamoto et al. ................ 403/373 X |
| 5,934,150 | 8/1999 | Srinivas et al. ..................... 403/104 X |
| 5,941,129 | 8/1999 | Anspaugh et al. ......................... 74/493 |

*Primary Examiner*—Terry Lee Melius
*Assistant Examiner*—John Cottingham
*Attorney, Agent, or Firm*—Laubscher & Laubscher

[57] ABSTRACT

In a device for holding a first member in position relative to a second member, the first member and the second member are connected by a clamping system having a clamping axle passing through the members. A relatively soft plastics material adhesion shoe is fixed to the second member. The clamping axle passes through the adhesion shoe. A metal rack having teeth is disposed on a base which is mounted on the clamping axle. When the clamping system is immobilized in a locked position, the teeth of the rack penetrate the relatively soft plastics material of the adhesion shoe in order to guarantee that the first member is held in position relative to the second member.

13 Claims, 3 Drawing Sheets

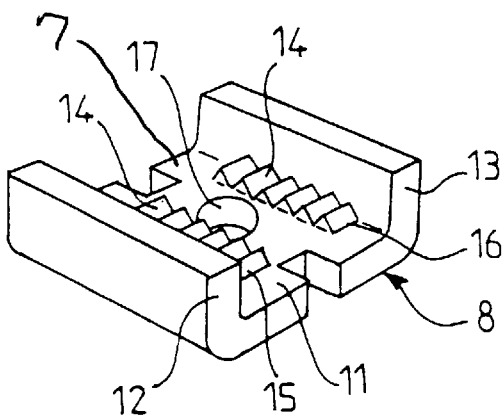
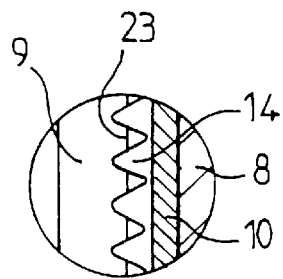
FIG. 5          FIG. 4
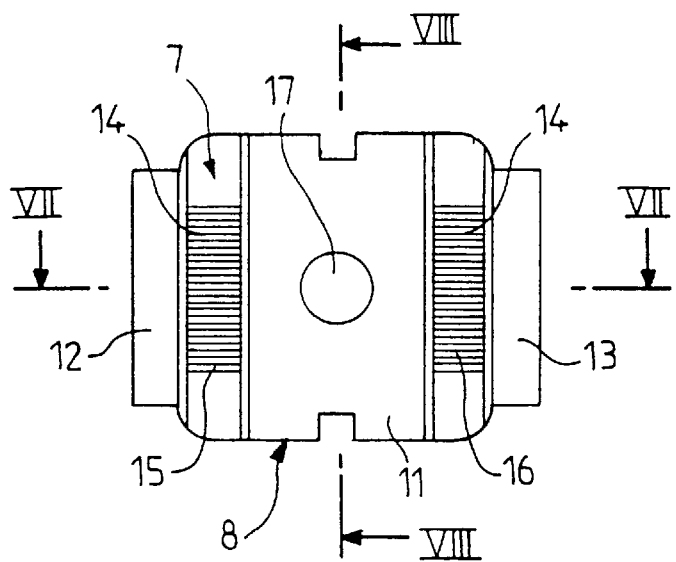
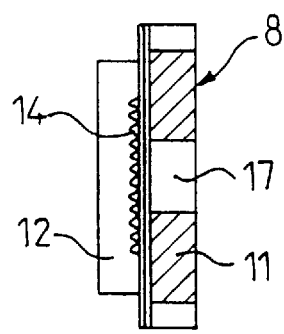
FIG. 6          FIG. 8
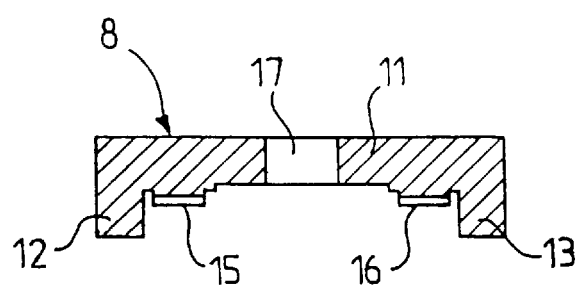
FIG. 7

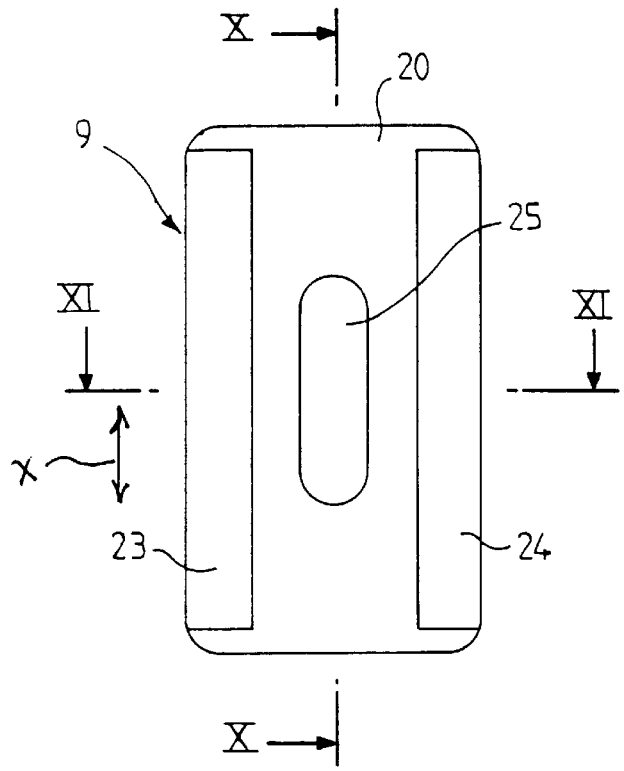
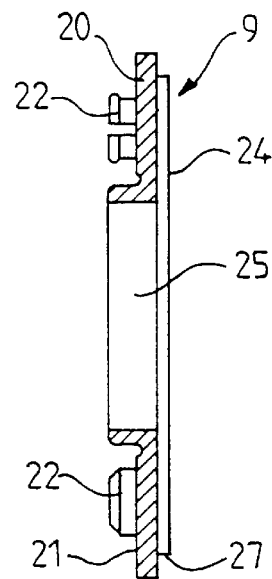
FIG.9　　　　　　　FIG.10
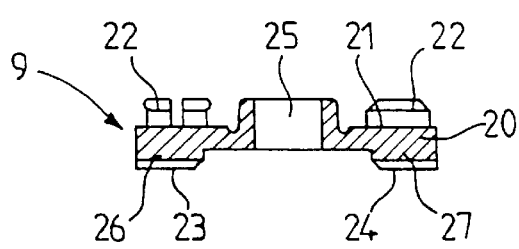
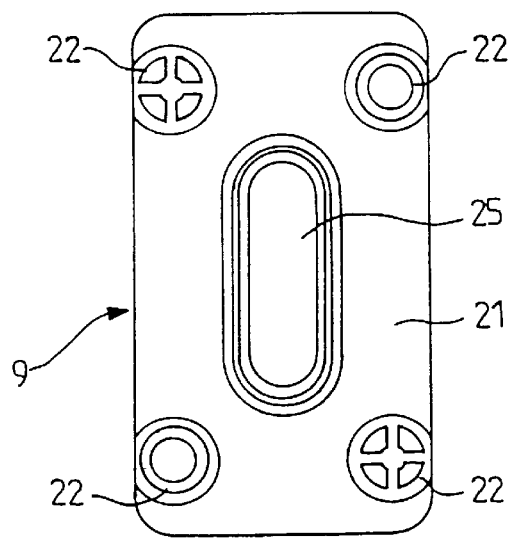
FIG.11　　　　　　　FIG.12

APPARATUS FOR CLAMPING TOGETHER TWO MEMBERS

BACKGROUND OF THE INVENTION

1. Field of the Invention

The present invention concerns a device for holding in position a system for clamping together two members. The clamping system has a clamping axle passing through each of the two members. This holding device is applicable in particular to an automobile vehicle steering column, the height and/or the depth of steering column being adjustable in the vertical plane.

2. Description of the Prior Art

In an adjustable automobile vehicle steering column, the system for adjusting the height or the depth in the vertical plane requires the position chosen by the driver to be maintained. In existing devices there is provision for adding to the clamping system of the position adjustment system a device with metal teeth, which are connected to each of the inserted members, so that the mechanical teeth come into contact with each other to maintain the chosen position. During clamping, however, a tooth-to-tooth situation can arise, which leads to grating and then to cracking of the flanks of the teeth against each other. Such phenomena compromise the mechanical strength of the device and make the driver feel unsafe.

OBJECTS OF THE INVENTION

The main object of the present invention is to provide a device for holding in position a system for clamping together two members. The device applies in particular to a clamping system of a system for adjusting an automobile vehicle steering column.

Another object of the present invention is to provide a holding device which avoids the drawbacks described hereinabove.

A further object of this invention is to integrate easily such a holding device into existing steering columns, guaranteeing that the clamping system concerned is held in position.

SUMMARY OF THE INVENTION

According to the invention, the device for holding a first member in position relative to a second member has a structure in which the first member and the second member are connected by a clamping system having a clamping axle passing through the members.

The holding device includes
  an adhesion shoe made in relatively soft synthetic plastic material, the adhesion shoe being fixed to the second member, and the clamping axle passing through the adhesion shoe, and
  a metal rack having teeth, the rack being on a base mounted on the clamping axle,
  whereby, when the clamping system is immobilized in a locked position, the teeth of the rack penetrate the relatively soft synthetic plastic material of the adhesion shoe in order to guarantee that the first member is held in position relative to the second member.

Advantageously, according to the invention, the holding device comprises a rack which has a structure which is described hereafter.

The base of the metal rack includes two respective flanges which are located respectively on sides of the rack. Each of the two flanges extending along the rack, the two flanges being substantially perpendicular to the base in order to form a stirrup member.

The distance between the two flanges of the stirrup member is greater than the width of the adhesion shoe so that, when the clamping system is immobilized in its locked position, the flanges of the stirrup member surround the adhesion shoe and bear against the second member to assure positive abutment of the clamping system.

Moreover, in order to easily adjust position of the holding device, the latter includes a return spring adapted to bias the clamping system towards the unlocked position so that, when the clamping system is released the teeth of the rack emerge from the adhesion shoe. The return spring is mounted on the clamping axle and disposed between the base of the stirrup member and the adhesion shoe.

To guarantee that the device of the invention is sufficiently strong and to prevent any possibility of creep of the synthetic plastic material of the adhesion shoe, the two flanges of the stirrup member come into contact with the corresponding face of the second member in order to assure a clean abutment. The distance between the two flanges of the stirrup member is very slightly greater than the width of the adhesion shoe.

This controls and limits the deformation of the adhesion shoe when the clamping system is immobilized in the locked position.

The holding device of the invention can be applied in particular to an automobile vehicle steering column. In this structure:
  the first member is a body tube of automobile vehicle steering column, the height and/or the depth of the steering column being adjustable in the vertical plane,
  a steering shaft is mounted to rotate freely in the body tube,
  the second member is a support member fixed to the chassis of the vehicle, and
  an adjustment system is provided for adjusting position of the steering column such that the body tube or first member is disposed in the support member or second member, the first member is placed at a wished position relative to the second member by means of the adjustment system, and the first member is immobilized relative to the second member in the locked position by the clamping system.

In one particularly interesting construction of the device, the adhesion shoe comprises a plate which has:
  a bearing face provided with fixing lugs which are adapted to engage in corresponding holes in the second member,
  two contact faces which are oriented in the adjustment direction and which are disposed on respective opposite sides of an oblong hole in the plate through which the axis of the clamping system passes and allowing movement of the axis during adjustment of position, and
  two protuberances respectively carrying the two contact faces to enable penetration of the teeth of the rack into the two contact faces.

The holding device has a stirrup member which includes:
  the base which includes a hole through which the clamping axle passes,
  the rack which has two tracks with teeth, the tracks being oriented in the adjustment direction and extending on respective sides of the hole, and
  the flanges which are respectively disposed at ends of the base and along the tracks with teeth whereby the stirrup member has a U-section.

The holding device has a return spring which is made in flexible sheet. The return spring includes:

a hole through which passes the clamping axle made in a central portion of the return spring which is disposed against the base of the stirrup member, and flexible curved portions which extend on respective opposite sides of the central portion and which bear on the adhesion shoe between the two contact faces, the return spring being dimensioned so that it can be disposed between the two tracks with teeth of the base of the stirrup member and between the two contact faces of the adhesion shoe.

The device in accordance with the invention for holding in position a system for clamping two members assures radial and/or axial adjustment and eliminates the problems of tooth on tooth, grating and flowing of the synthetic plastic material encountered in existing systems and guarantees positive clamping by penetration of teeth into the soft synthetic plastics material when the system is in the locked position.

BRIEF DESCRIPTION OF THE DRAWINGS

The foregoing and other objects, features and advantages of the invention will be apparent from the following detailed description of several embodiments of the invention with reference to the corresponding accompanying drawings in which:

FIG. 4 shows a detail from FIG. 3;

FIG. 5 is a perspective view of the stirrup member shown in FIG. 1;

FIG. 6 is a top view of the stirrup member from FIG. 5;

FIG. 7 is a view in section taken along the line VII—VII in FIG. 6;

FIG. 8 is a view in section taken along the line VIII—VIII in FIG. 8;

FIG. 9 is a view of the adhesion shoe shown in FIG. 1;

FIG. 10 is a view in section taken along the line X—X in FIG. 8;

FIG. 11 is a view in section taken along the line XI—XI in FIG. 9; and

FIG. 12 is a view of the bearing face of the adhesion shoe.

DESCRIPTION OF THE PREFERRED EMBODIMENTS

Figure 1:
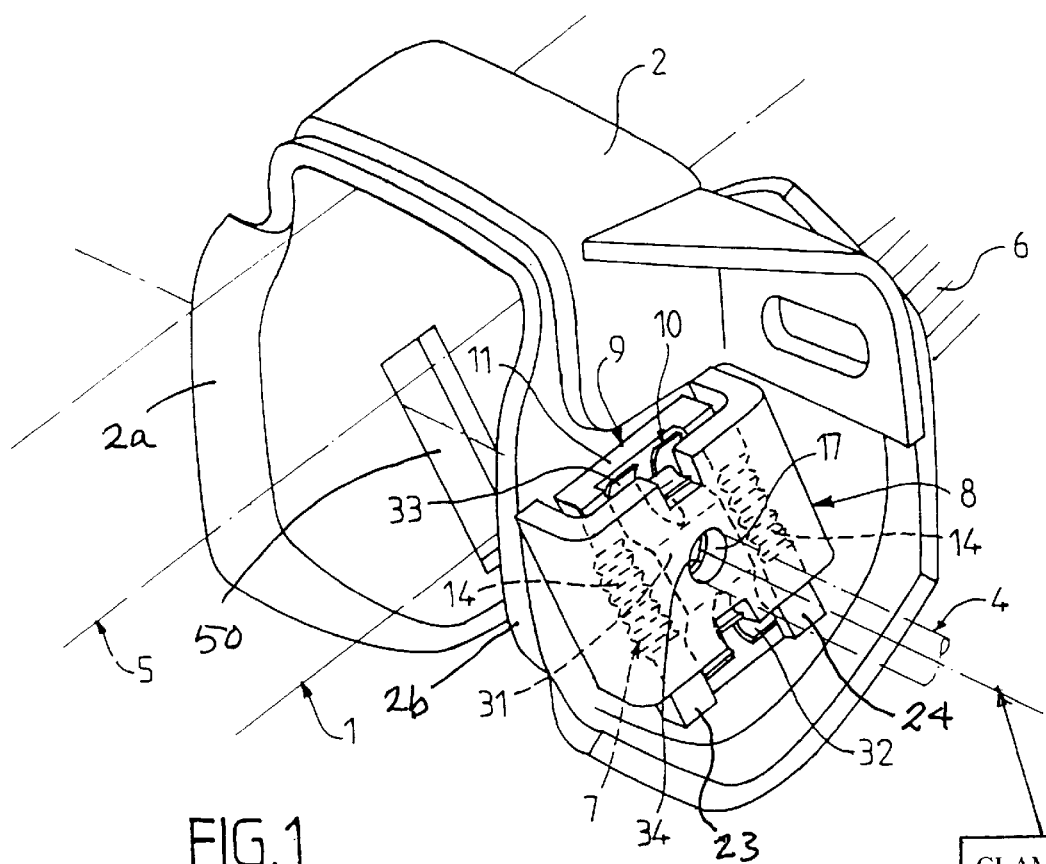
FIG. 1 is a perspective view of a device in accordance with the invention for holding in position a system for clamping two members belonging to an automobile vehicle column.
Figure 2:
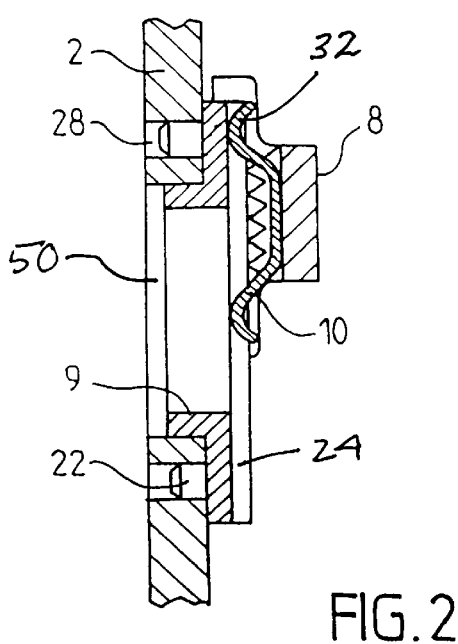
FIG. 2 is a view in section taken along the line II—II in FIG. 1 in the unlocked position.
Figure 3:
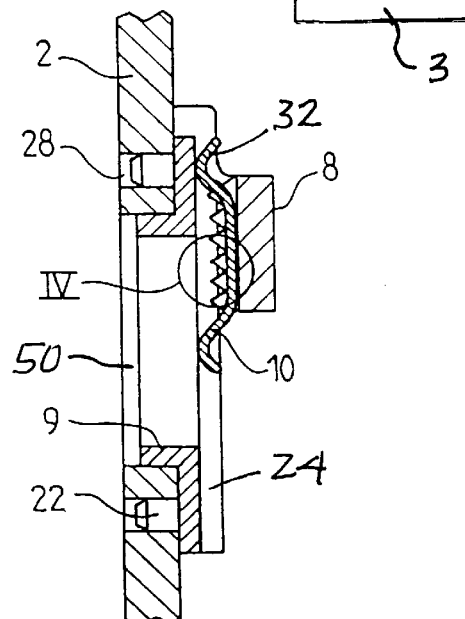
FIG. 3 is a view similar to FIG. 2 in the locked position.

As can be seen in FIGS. 1 through 5, the holding device of the invention is concerned with holding a first member 1 in position relative to a second member 2. The member 1 and the member 2 are connected conventional clamping system 3. The clamping system 3 has a clamping axle 4 that passes through the members 1 and 2. As shown in FIGS. 1–3, the axle 4 extends through opposed slots 50 contained in the spaced arm portions 2a and 2b of the second member 2.

The holding device essentially includes an adhesion shoe 9 and a metal rack 7. The adhesion shoe 9 is made from a relatively soft synthetic plastic material. The adhesion shoe 9 is fixed to the member 2 and is crossed by the clamping axle 4. The metal rack 7 has provided with teeth 14 arranged in two parallel spaced tracks 15 and 16. The rack 7 is arranged on a base 11 which is mounted on the clamping axle 4. The adhesion shoe 9 and the metal rack 7 are disposed relative to each other so that, when the clamping system 3 is immobilized in a locked position, the teeth 14 of the rack 7 penetrate the soft synthetic plastic material of the adhesion shoe 9 to guarantee that the member 1 is held in position relative to the member 2.

The base 11 of the metal rack 7 includes two flanges denoted 12 and 13. Each of the flanges 12 and 13 is on a respective side of the rack 7, and each flange 12 and 13 extends along said rack 7. The two flanges 12 and 13 are substantially perpendicular to the base 11 to form a stirrup member 8.

The distance between the two flanges 12 and 13 of the stirrup member 8 is greater than the width of the adhesion shoe 9 so that, when the clamping system 3 is immobilized in the locked position, the flanges 12 and 13 of the stirrup member 8 surround the adhesion shoe 9 and bear against the member 2 in order to obtain a positive abutment of the clamping system 3.

The distance between the two flanges 12 and 13 of the stirrup member 8 is also very slightly greater than the width of the adhesion shoe 9 in order to control and limit deformation of said adhesion shoe 9 when the clamping system 3 is immobilized in the locked position.

To facilitate return of the clamping system to an unlocked position, the holding device of the invention includes a return spring 10. The return spring 10 is disposed such that, when the clamping system 3 is released, the teeth 14 of the rack 7 disengage from the adhesion shoe 9. The return spring 10 is mounted on the clamping axle 4 and is disposed between the base 11 of the stirrup member 8 and the adhesion shoe 9. The holding device of the invention is shown in the unlocked position in FIG. 2 and in the locked position in FIG. 3. FIG. 4 clearly shows the penetration of the teeth 14 of the rack 7 into the adhesion shoe 9.

The holding device of the invention applies in particular to an automobile vehicle steering column in which:

the first member 1 is an automobile vehicle steering column body tube, the height and/or the depth of said column being adjustable in the vertical plane;

a steering shaft 5 is mounted to rotate freely in the body tube;

the second member 2 is a support member fixed to the chassis of the vehicle 6; and an adjustment system for adjusting the position of the steering column is arranged such that the body tube or member 1 is disposed in the support member or member 2, the member 1 is placed at the required position relative to the member 2 by means of the adjustment system, and the member 1 is immobilized relative to the member 2 in the locked position by the clamping system 3.

As can be seen in FIGS. 9 through 12, the adhesion shoe 9 comprises a plate 20. The plate 20 has:

a bearing face 21 provided with fixing lugs 22 that enter corresponding holes 28 made in the member 2;

two contact faces 23 and 24 which are oriented in the adjustment direction X parallel with the slots 50 (FIGS. 1–3) and which are disposed on respective opposite sides of an oblong hole 25 in plate 20 through which the axle 4 of the clamping system passes and allowing movement of said axle 4 in the direction x during position adjustment; and two protuberances 26 and 27 respectively carrying the two contact faces 23 and 24 to enable the teeth 14 of the rack 7 to penetrate both contact faces 23 and 24.

As can be seen in FIGS. 6 through 8 the stirrup member 8 includes:

the base 11 which has a hole 17 through which the clamping axle 4 passes;

the rack 7 which has two tracks 15 and 16 which are provided with teeth 14; each of the paths 15 and 16 is oriented in the adjustment direction and is disposed on a respective side of the hole 17;

each of the flanges 12 and 13 which is disposed at a respective end of the base 11 and along the respective track 15, 16 provided with the teeth 14 thereby forming a stirrup member 8 having a U-section.

As can be seen in FIGS. 1 through 3 the return spring 10 is made in flexible sheet metal. The return spring 10 includes:

a hole 34 through which the clamping axle 4 passes, made in a central portion 31 of the spring which is disposed against the stirrup member 8;

flexible curved portions 32 and 33 which extend on respective opposite sides of the central portion 31 and which bear on the adhesion shoe 9 between the two contact faces 23 and 24.

The return spring 10 is dimensioned so that it can be disposed between the two tracks 15 and 16 with the teeth 14 of the stirrup member 8 and between the two contact faces 23 and 24 of the adhesion shoe 9.

The teeth 14 of the metal rack 7 therefore penetrate the adhesion shoe 9 which assures positive clamping of the steering column adjustment system. This feature of the teeth 14 penetrating the adhesion shoe 9 which is smooth avoids the grating and tooth-on-tooth problems encountered in existing tooth-on-tooth rack clamping systems.

The benefit of an adhesion shoe 9 made in smooth and soft synthetic plastic material is that it reduces cost and weight. It can also withstand considerable system locking-unlocking cycles throughout the service life of the vehicle without destroying the synthetic plastic material adhesion shoe 9.

The use of an adhesion shoe 9 made in synthetic plastic material leads to a problem with relaxation of the plastics material under stress, which is controlled and cancelled by the stirrup member 8 of the rack 7. During clamping, the teeth 14 of the steel rack 7 are pressed into the smooth synthetic plastic material adhesion shoe 9 until the stirrup member 8 comes into contact with the corresponding face of the member 2 to assure a clean abutment. This bearing engagement of the stirrup member 8 on a face of the member 2 provides a positive bearing engagement and therefore prevents loss of the tension in the clamping system that could otherwise be caused by the relaxation phenomena encountered with any synthetic plastic material.

The arrangement in accordance with the invention therefore guarantees that the steering column always withstands forces applied to the steering wheel by the driver. Further, the contact of the stirrup member 8 with the corresponding face of the member 2 takes a portion of the force required for proper retention of the steering column when the system has been locked.

What we claim is:

1. An assembly for clamping a first member against lateral displacement relative to a second member, the first member carrying a clamping system including a clamping axle that extends transversely from the first member through an enlarged opening contained in the second member, thereby to permit lateral adjustment of the first member in a given adjustment direction relative to the second member, comprising:

(a) an adhesion shoe formed of relatively soft synthetic plastic material, said adhesion shoe being adapted for mounting on the first member across the enlarged opening contained therein, said adhesion shoe including:

(1) means for preventing lateral displacement of said adhesion shoe relative to the second member;

(2) said adhesion shoe containing an enlarged opening opposite the second member enlarged opening for receiving the clamping axle; and (b) a metal rack having a base containing a through bore for receiving the clamping axle, said rack including teeth arranged to penetrate the surface of said adhesion shoe, whereby said clamping system is immobilized in a locked position, said rack is displaced toward a locked position relative to said shoe, thereby to clamp the clamping axle and the first member against lateral displacement relative to the second member.

2. An assembly as defined in claim 1, wherein:

said base of said metal rack includes respective flanges on sides of said rack, each of said flanges extending along said rack and being substantially perpendicular to said base thereby forming a stirrup member, and the distance between said two flanges of said stirrup member is greater than the width of said adhesion shoe so that, when said clamping system is immobilized in said locked position, said flanges of said stirrup member surround said adhesion shoe and bear against said second member to assure positive abutment of said clamping system.

3. An assembly as defined in claim 1, wherein the distance between said flanges of said stirrup member is very slightly greater than the width of said adhesion shoe so as to control and to limit deformation of said adhesion shoe when said clamping system is immobilized in said locked position.

4. An assembly as defined in claim 1, and further including a return spring adapted to bias said clamping system towards an unlocked position so that, when said clamping system is released, said teeth of said rack emerge from said adhesion shoe, said return spring being mounted on said clamping axle and disposed between said base and said adhesion shoe.

5. An assembly as defined in claim 1, wherein:

the first member is a body tube of automobile vehicle steering column, the height or the depth of the steering column being adjustable in a vertical plane, a steering shaft is mounted to rotate freely in the body tube, the second member is a support member fixed to a chassis of the vehicle, and an adjustment system is provided for adjusting position of said steering column such that the first member is disposed in the second member, the first member is placed at a position relative to the second member by means of said adjustment system, and the first member is immobilized relative to the second member in said locked position by said clamping system.

6. The assembly defined in claim 5, wherein said adhesion shoe comprises a plate which has:

a bearing face provided with fixing lugs which are adapted to engage in corresponding holes in the second member, two contact faces which are disposed on respective opposite sides of an oblong hole in said plate through which said clamping axle passes and allowing movement of said clamping axle during adjustment of position, and two protuberances respectively carrying said two contact faces to enable penetration of said teeth of said rack into said two contact faces.

7. The assembly defined in claim 5, wherein said rack which has two tracks with teeth, each of said tracks extending on respective sides of said bore, and said rack including a pair of flanges which are respectively disposed at ends of said base and along said tracks with teeth, thereby to define a stirrup member having a U-section.

8. The assembly defined in claim 1, and further comprising a return spring formed from a flexible sheet and including:

a hole through which passes said clamping axle, made in a central portion of said return spring which is disposed against said base, and flexible curved portions which extend on respective opposite sides of said central portion and which bear between said two contact faces on said adhesion shoe, said return spring being dimensioned to be disposed between two tracks with teeth of said base and between said two contact faces of said adhesion shoe.

9. Adjustable vehicle steering apparatus, comprising:

(a) a vehicle steering column including a body tube first member (1);

(b) a bifurcated second member (2) connected with the vehicle chassis (6); said second member including a pair of spaced arm portions (2*a*, 2*b*) between which said first member is transversely received;

(c) an axle (4) extending transversely from said first member through opposed enlarged slots (50) contained in said arm portions of said second member, respectively, thereby to define an axis of lateral adjustment X of said first member relative to said second member;

(d) an adhesion shoe (9) formed of relatively soft synthetic plastic material, said adhesion shoe being mounted on said second member over one of the slots contained therein, said adhesion shoe containing an elongated opening (25) corresponding with and opposite the associated slot, said axle extending through said adhesion shoe opening, said adhesion shoe including orientation means (22) for orienting said adhesion shoe relative to said second member to cause said elongated opening to be parallel with the associated slot contained in said second member; and (e) a metal rack (7) arranged on the opposite side of said adhesion shoe from said second member, said rack carrying a plurality of teeth (14) adjacent said adhesion shoe, said rack containing an opening receiving said axle and being displaceable axially of said axle from a disengaged position spaced from said adhesion shoe toward a locked position in which said teeth penetrate the surface of said adhesion shoe.

10. An assembly as defined in claim 9, and further including spring means (10) biasing said metal rack toward said released position relative to said adhesion shoe.

11. An assembly as defined in claim 10, and further wherein said adhesion shoe includes a pair of spaced contact faces (23) and (24) arranged parallel with and on opposite sides of said elongated opening, said contact faces protruding from said adhesion shoe in the direction of said metal rack, said metal rack including on opposite sides of said rack opening a pair of track (15, 16) of said teeth that extend parallel with and in the direction of said contact faces, respectively.

12. An assembly as defined in claim 11, wherein said spring means comprises a leaf spring formed from flexible sheet metal, said leaf spring being arranged between said contact faces and said tracks of teeth.

13. An assembly as defined in claim 12, wherein said rack includes a pair of parallel flange portions (12, 13) that extend toward said second member on opposite sides of said adhesion shoe, said flange portions being in abutting engagement with said second member when said rack is in said locked position.

\* \* \* \* \*